US009651672B2

(12) United States Patent
Alpert et al.

(10) Patent No.: US 9,651,672 B2
(45) Date of Patent: May 16, 2017

(54) SYSTEMS AND METHODS FOR TIME SYNCHRONIZATION

(71) Applicant: Intel Corporation, Santa Clara, CA (US)

(72) Inventors: Yaron Alpert, Hod Hasharoni (IL); Haim Rochberger, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 1269 days.

(21) Appl. No.: 13/626,235

(22) Filed: Sep. 25, 2012

(65) Prior Publication Data

US 2014/0085136 A1 Mar. 27, 2014

(51) Int. Cl.
*G01S 19/23* (2010.01)
*H04W 56/00* (2009.01)
*G01S 19/34* (2010.01)
*G01S 19/24* (2010.01)

(52) U.S. Cl.
CPC .......... *G01S 19/23* (2013.01); *H04W 56/005* (2013.01); *H04W 56/0015* (2013.01); *H04W 56/0075* (2013.01); *G01S 19/24* (2013.01); *G01S 19/34* (2013.01); *Y02B 60/50* (2013.01)

(58) Field of Classification Search
CPC .......... H04W 56/0015; H04W 56/0075; G01S 19/23; G01S 19/24; G01S 19/34
USPC .......................... 342/357.62, 357.74, 357.63
See application file for complete search history.

(56) References Cited

U.S. PATENT DOCUMENTS

| 6,748,202 B2 * | 6/2004 | Syrjarinne | H04W 56/0015 342/357.64 |
|---|---|---|---|
| 6,816,510 B1 | 11/2004 | Banerjee | |
| 7,072,432 B2 * | 7/2006 | Belcea | H04J 3/0667 370/235 |
| 7,366,532 B2 | 4/2008 | Khawand et al. | |
| 7,917,113 B2 * | 3/2011 | Palenius | H04W 36/0088 370/324 |
| 7,974,647 B2 * | 7/2011 | Ho | H04W 56/00 455/502 |
| 8,611,377 B2 * | 12/2013 | Uemura | H04W 56/0015 370/329 |
| 2005/0159152 A1 | 7/2005 | Tice et al. | |
| 2009/0059827 A1 * | 3/2009 | Liu | H04W 76/048 370/311 |
| 2010/0317374 A1 | 12/2010 | Alpert et al. | |

(Continued)

OTHER PUBLICATIONS

International Search Report and Written Opinion received for PCT Patent Application No. PCT/US2013/047917, mailed on Oct. 21, 2013, 10 Pages.

*Primary Examiner* — Chuong P Nguyen
(74) *Attorney, Agent, or Firm* — Stoel Rives LLP (57) ABSTRACT

A method and system for time synchronization in a mobile device are disclosed. The method includes negotiating a synchronization schedule. The synchronization schedule defines a plurality of synchronization times for receiving synchronization messages. The method further includes transitioning the mobile device from a first state to a second state to receive a synchronization message. The mobile device uses less power in the first state than the second state and the mobile device cannot receive the synchronization message when in the first state. The method further includes synchronizing a clock component in response to receiving the synchronization message.

16 Claims, 7 Drawing Sheets

(56) References Cited

U.S. PATENT DOCUMENTS

2011/0064072 A1     3/2011   Wang et al.
2012/0005511 A1     1/2012   Sengupta et al.
2014/0198772 A1*   7/2014   Baldemair .......... H04L 27/2655
                                                                 370/335

* cited by examiner

SYSTEMS AND METHODS FOR TIME SYNCHRONIZATION

TECHNICAL FIELD

This disclosure relates to systems and methods for time synchronization on a mobile device. Specifically, this disclosure relates to systems and methods for efficient sending and receiving of time synchronization messages.

BACKGROUND

Accurate time synchronization between devices at different locations is required in a variety of computing applications. Example applications include pinpointing a geographic location of a mobile device using a global navigation satellite system (GNSS) or timing for sending messages within a wired or wireless network such that there is no interference between messages. These applications can require time synchronization between devices to be within milliseconds, microseconds, or even sub microsecond ranges of each other in order for a function to be accurately performed.

Because clocks with extreme accuracy are expensive, fragile, and/or are difficult to maintain, consumer devices generally include less expensive and less accurate clocks. For example, many GNSS receiver units, mobile phones, personal digital assistants (PDAs), and other devices include less accurate clocks, such as a quartz based clock. These less accurate clocks, which may be adequate for some purposes, such as for calendaring user events, generally lose or gain many nanoseconds or microseconds within short periods of time. Thus, dependence on these clocks alone in scenarios that require high accuracy may significantly limit or completely impede any ability to perform certain functions.

DETAILED DESCRIPTION

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As mentioned above, accurate time synchronization between devices is often useful. Numerous applications and functions may be dependent on accurate synchronization and thus may be subject to the teaching provided herein. However, for clarity, the present disclosure will focus on the use of time synchronization in order to more efficiently use a satellite navigation system such as a global navigation satellite system ("GNSS") or time synchronization based on the Third Generation Partnership Project (3GPP) (e.g., 2G, 3G, WCDMA, LTE, etc.). One of skill in the art will recognize that the present teaching with respect to time synchronization will also be useful with regard to other synchronization sensitive applications or information elements. For example, the present teaching may be applied in situations where accurate time synchronization may be needed to accurately time messages sent within a network.

Although many aspects of the operation of GNSS systems are beyond the scope of this disclosure, a general description and understanding may be helpful. In many embodiments, GNSS systems include a plurality of satellites that transmit time stamped signals. These signals can be received by a receiver (GNSS receiver) which can evaluate the signals, including a time at which the signals were sent, and perform calculations to obtain an approximate geographic location, or fix, of the GNSS receiver. Examples of GNSS systems include satellite navigation systems operated by various governments such as the United States' Global Positioning System (also known as "GPS"), Russia's Global Navigation Satellite System (also known as "GLONASS"), and the European Union's Galileo positioning system. Skilled persons will recognize many other satellite navigation systems such as COMPASS, GINS, Regional Satellite System (e.g., QZSS and IRNSS), and Augmentation Satellite System/SBAS systems (e.g., WAAS, MSAS, GAGAN, SDCM, MASS, etc.). One of skill will understand that other satellite navigation systems without global scope may also be subject to the teaching provided herein.

Generally, in order to evaluate the signals and perform the necessary calculations, a GNSS receiver or a mobile device with a GNSS receiver first scans for satellites to locate and identify the signals from the satellites. This is because some satellites will be out of range for the device while other satellites will be in range. Furthermore, the satellites are constantly moving, so new locations of the satellites should be determined. Thus, knowledge of a current location and time can help a GNSS receiver to know which satellites to look for, as well as what their signals might look like. GNSS systems will generally produce location and time synchronization data but this data is often produced at a slow rate and over large periods of times, such as a minute. Thus, a GNSS receiver may be required to listen to a satellite signal for a long period of time before being able to produce accurate time and location information.

In mobile devices that also have the capability of receiving data over a wireless communication network (e.g., by conducting a time synchronization procedure between a base station and the mobile device) in addition to having a GNSS receiver, a variety of methods may be used to speed up the acquisition of satellite signals. For example, information regarding an approximate current location and/or accurate current time can be sent to the mobile device which can then use this information as a starting point to more quickly locate and identify satellite signals. By sharing this information received over a wireless network with a GNSS receiver, the GNSS receiver may be able to determine an adequately accurate location without waiting for and fully decoding all the information sent by the satellites, which reduces satellite signal acquisition time. These methods and services using data networks to speed up obtaining a GNSS position are often referred to as assisted global positioning or A-GPS. Generally speaking, the more accurately that the time of a mobile device that matches that of the satellites, the more quickly a fix (location or coordinates) may be obtained. For example, if the clock of the mobile device is accurate within microseconds of the satellite clocks, very little time may be needed for acquiring the satellite signals.

One method for synchronizing the clocks of the mobile device with a more accurate clock includes having a mobile device request synchronization in response to detecting an inaccuracy of its clock or a drift in the time of the clock. A device with a more accurate clock time may then send a message to the mobile device with information allowing the mobile device to update its own clock to a more accurate time.

However, significant amounts of energy (i.e., mobile device power consumption) can be expended in sending the request for synchronization, as well as waiting for the responsive synchronization message (i.e., response time/ TTFF (time to first fix)). While this energy and delay may be seemingly small or irrelevant in relation to devices that are plugged into a power grid, this energy can quickly dissipate the limited available power within a battery of a portable device.

Mobile devices often have a plurality of states in which the device itself or components of the device may be placed to save power. For example, a mobile device may have an awake state where more power is consumed and sleep or idle states in which very little power is consumed. However, the mobile device may also be incapable of certain functions or may have reduced functionality in the sleep or idle states as compared to the awake state. For example, the mobile device may be incapable of sending or receiving messages over a wireless data connection while in the sleep state. As another example, a GNSS receiver may not be able to detect satellite signals while in the sleep state. As a further example, the mobile device's clock may have degraded precision in the sleep or idle states as compared to the awake state, which may lead to quick build up of clock drift or time errors. Thus, many of the functions used to obtain a GNSS fix and enable assisted global positioning functionality are not available in a sleep or idle state and a mobile device may often be forced to be in the awake state and thus utilize power at a higher rate. For these reasons, GNSS functionally is often energy intensive and can often lead to accelerated battery drain and the inconveniences or dangers of a low or dead battery.

However, the use of GNSS location pinpointing is increasing. For example, a proposed standard by 3GPP utilizes "continuous location" where the location of a mobile device is very frequently obtained and/or logged. The applicants have recognized that, due to the amount of time that conventional methods require to obtain a location, mobile devices may be limited in their abilities to enter sleep states and thus poorer battery life will likely be experienced.

In recognition of the above problems, applicants have developed a method and system for synchronization that may lead to significant power savings, especially in situations where frequent time synchronization is needed. Applicants disclose herein a variety of methods and systems for increasing the efficiency of time synchronization. In one embodiment, a method for time synchronization eliminates the requirement for a mobile device to send a request each time a new synchronization procedure is needed. In one embodiment, significant power consumption and/or computational savings may result. In one embodiment, a method for time synchronization includes negotiating a synchronization schedule and then expecting synchronization messages according to the synchronization schedule. Negotiating a schedule in advance may allow a mobile device to receive synchronization messages without sending a synchronization request each time a new synchronization is needed. In one embodiment, a mobile device may be able to enter sleep or idle states during times when no synchronization messages are scheduled to be sent and then wake up in time to receive the scheduled synchronization messages. Waking up in time to receive the scheduled synchronization messages may allow the mobile device to be in sleep or idle states for significantly greater amounts of time, leading to increased power savings.

Figure 1:
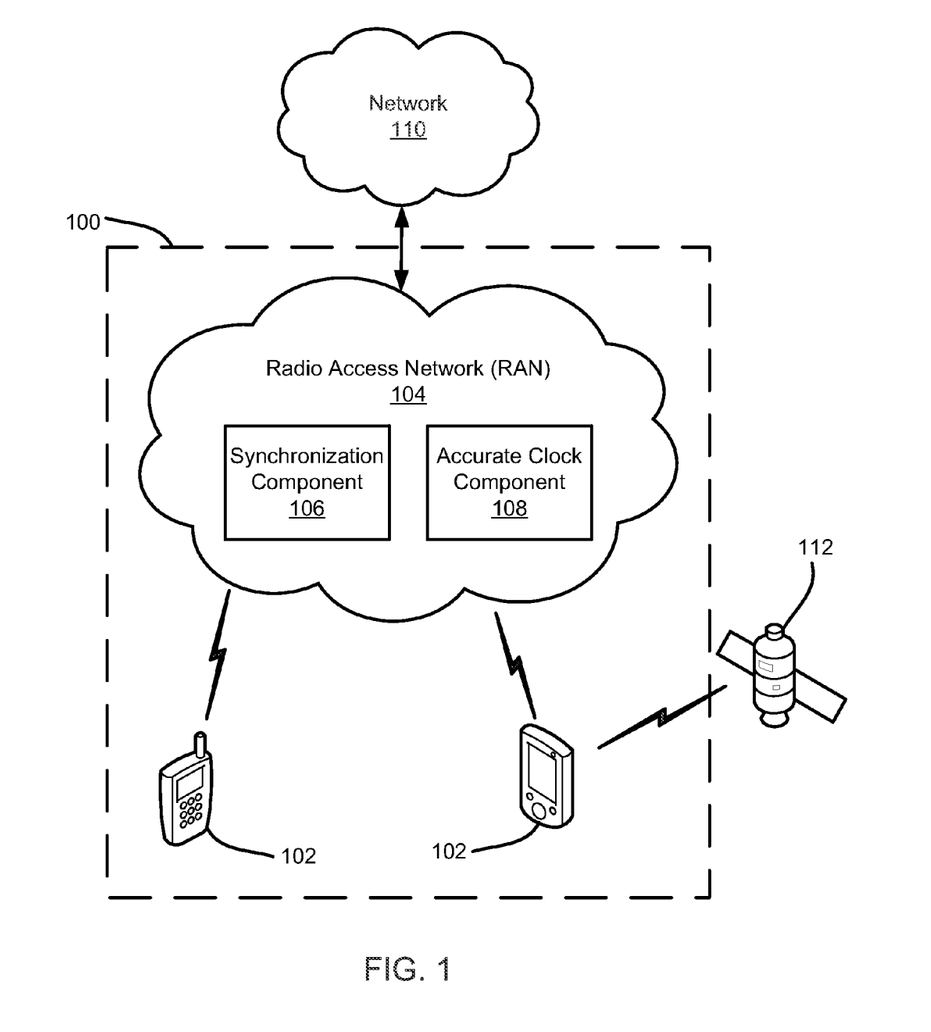
FIG. 1 illustrates an example of a system for efficient time synchronization on a mobile device consistent with embodiments disclosed herein.

FIG. 1 illustrates an example of a system 100 for efficient time synchronization on a mobile device 102. The system 100 is shown with examples of components including a radio access network (RAN) 104 and one or more mobile devices 102. The depicted RAN 104 includes a synchronization component 106 and an accurate clock component 108. In other embodiments, the synchronization component 106 and an accurate clock component 108 may be included in any device or system in communication with a network 110, the RAN 104, or the mobile devices 102. The RAN 104 is shown in communication with the network 110 and one of the mobile devices 102 is shown in communication with a satellite 112. According to one embodiment, the RAN 104 provides the mobile devices 102 with wireless access to the network 110. Thus, any device or system in communication with the network 110 and/or RAN 104 may be able to communicate with the mobile devices 102.

The mobile devices 102 may include any type of communication device or data processing device known in the art. Examples of mobile devices 102 may include, but are not limited to, a mobile phone, such as a low-end phone, feature phone or a smart phone, a personal digital assistant (FDA), a GNSS device such as a GNSS receiver, a tablet computer, a laptop computer, Ultrabook™, or the like. In one embodiment, a mobile device 102 may include a device that includes a GNSS receiver and is fixable at a specific location.

In one embodiment, the mobile devices 102 may be used to perform synchronization sensitive functions. For example, the mobile devices 102 may be used to obtain a GNSS location. In one embodiment, a mobile device 102 may be configured to efficiently synchronize with one or more accurate clock source, such as the accurate clock component 108. In one embodiment, the mobile device 102 may be configured to negotiate a synchronization schedule and be available to receive synchronization messages at scheduled synchronization times. In one embodiment, the mobile device 102 may be configured to transition from sleep or idle states to an awake state in order to receive the scheduled synchronization messages. In one embodiment, the mobile device 102 is not required to send a message requesting synchronization each time a synchronization is needed or each time a synchronization message is sent. Further description and discussion of the mobile device 102 is provided below.

The RAN 104 may include a plurality of components including base stations, antennas, computing systems, or other devices or systems to communicate with the mobile devices 102 and/or network 110. In one embodiment, the RAN 104 may provide one or more wireless access points for the mobile devices 102 to connect to the network 110. The network 110 may include any voice, data, or other communications network known in the art. For example, the network 110 and RAN 104 (and/or a plurality of additional RANs or networks) may form a communications network for voice, data, or other services. Communications networks may include a cable network, a mobile phone network, a satellite network, a computing network, the Internet, or the like.

The network 110 and/or RAN 104 may be implemented according to one or more of a wide variety of wireless communications standards including, but not limited to, IS-95 also known as Code Division Multiple Access (CDMA), Worldwide Interoperability for Microwave Access (WiMAX), Bluetooth, Global System for Mobile Communications (GSM), Universal Mobile Telecommunications System (UMT), Long Term Evolution (LTE), WiFi (IEEE 802.11 standards), and the like. The network 110 and/or RAN 104 may be implemented to other standards, such as future standards to be promulgated by the Institute of Electrical and Electronics Engineers (IEEE), 3GPP, or other standard setting organizations.

In one embodiment, the synchronization component 106 may negotiate with a mobile device 102 to determine a time information synchronization schedule that defines a plurality of synchronization times for the mobile device 102 to receive synchronization messages. In one embodiment, the synchronization component 106 may send scheduled synchronization messages according to a synchronization schedule. In certain embodiments, the synchronization schedule is predefined, negotiated, or renegotiated. The synchronization component 106 may send scheduled synchronization messages based on a time of the accurate clock component 108. In one embodiment, the synchronization component 106 may be part of a base station, server, computing system, or other device or system within the RAN 104. In other embodiments, the synchronization component 106 may be included in a device that is in communication with the RAN 104, network 110, and/or mobile devices 102.

The accurate clock component 108 may include a clock that is accurate to a current time of a reference clock or other relevant system. For example, the accurate clock component 108 may track a time that is accurate with respect to a time of a GNSS satellite, such as satellite 112, or a time of the network 110. In one embodiment, the accurate clock component 108 is accurate to within less than 10 microseconds (+/−10 microseconds) of a reference clock. Other embodiments may include clocks that are more accurate or less accurate, depending on the synchronization needs of a mobile device 102. In one embodiment, the accurate clock component 108 includes an accurate clock that independently tracks a relevant time with very little error. In another embodiment, the accurate clock component 108 receives synchronization messages from another device or system to maintain the time of the accurate clock component 108 within a desired accuracy range.

The satellite 112 may include any communications satellite or positioning satellite known in the art. For example, the satellite 112 may be a satellite of an array of satellites of a GNSS system. In one embodiment, the satellite 112 provides time-stamped signals which may be used by a GNSS receiver within the mobile device 102 to determine a current location of the mobile device 102.

Figure 2:
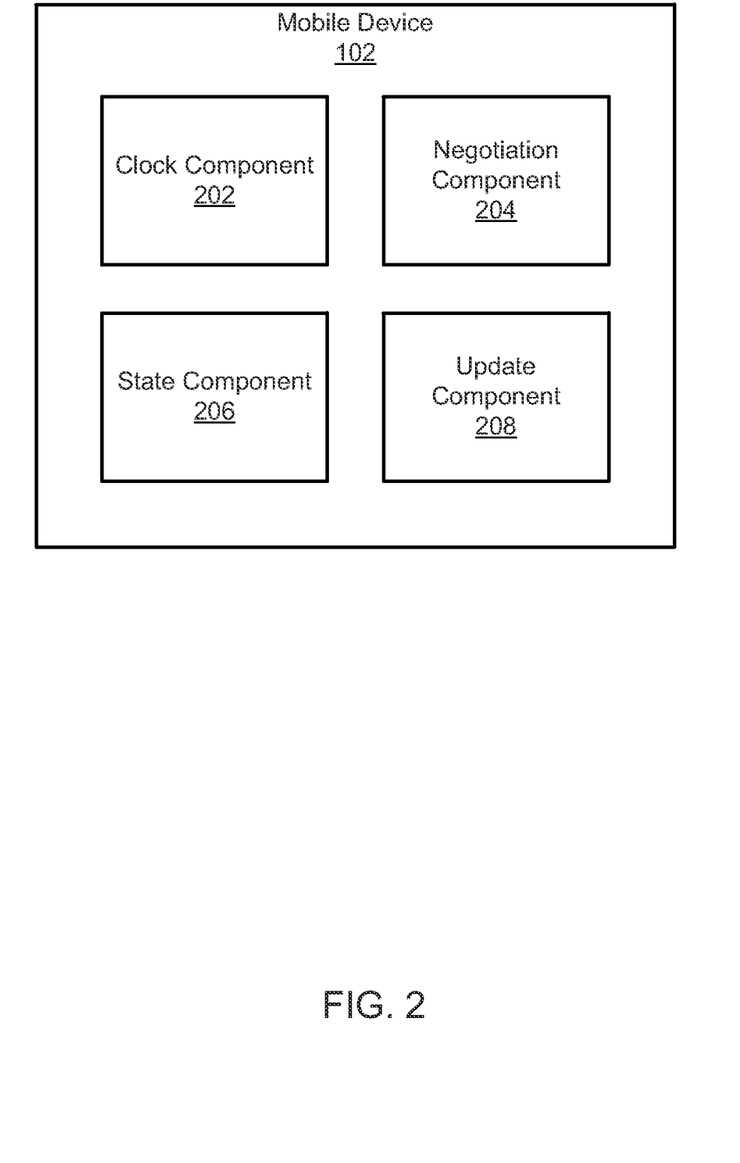
FIG. 2 illustrates a schematic block diagram of an example of a mobile device consistent with embodiments disclosed herein.

FIG. 2 illustrates a schematic block diagram of one embodiment of a mobile device 102. The mobile device 102 includes a clock component 202, a negotiation component 204, a state component 206, and an update component 208. The components 202-208 are provided by way of example only and may not be included in all embodiments. For example, the mobile device 102 may include one or any combination of two or more of the components 202, 204, 206, 208 in varying embodiments.

The clock component 202 maintains a current time. The clock component 202 may include any hardware or software based clock that keeps time. The clock component 202 can be based on a low accuracy clock that builds up error (e.g. clock drift) over time. In one embodiment, the clock component 202 includes a low cost clock or a low power clock source. In one embodiment, the clock component 202 can be based on a quartz based clock. In one embodiment, the accuracy of the clock component 202 varies depending on a state of the mobile device 102. For example, the clock component 202 may be more error prone when the mobile device is in a low power state, such as sleep or idle states.

The negotiation component 204 may include a scheduler to negotiate a synchronization schedule. In one embodiment, the negotiation component 204 negotiates the time synchronization schedule with an external synchronization component 106 located in the RAN 104, network 110, or other network or system.

According to one embodiment, the negotiation component 204 negotiates a synchronization schedule by suggesting a schedule and receiving an indication that the synchronization schedule is accepted. In another embodiment, the negotiation component 204 may receive a suggested synchronization schedule and provide an indication that the synchronization schedule is accepted. The negotiation component may include a scheduler to define a reporting pattern. The negotiation component 204 may suggest the synchronization schedule by sending a message to a synchronization component 106 that includes a suggested synchronization schedule. In one embodiment, the negotiation component 204 then receives a message from the external synchronization component 106 either accepting or rejecting the suggested schedule. If the schedule is accepted, the negotiation component 204 receives an indication that the synchronization schedule is accepted and the mobile device 102 operates according to the accepted schedule. If the schedule is rejected, the negotiation component 204 receives an alternate synchronization schedule or offers the alternate synchronization schedule. The negotiation component 204 either accepts or rejects the alternate synchronization schedule. The alternate synchronization schedule may be rejected by providing yet another synchronization schedule. If the schedule is rejected, the negotiation component 204 receives an indication that the synchronization schedule was rejected but may not receive an alternate synchronization schedule. The negotiation component 204 responds to an indication of rejection by proposing another version of a synchronization schedule. This back and forth of suggestion, rejection, etc., may continue until a synchronization schedule is accepted or other criteria are met.

In one embodiment, the negotiation component 204 negotiates a synchronization schedule that defines a plurality of synchronization times for receiving synchronization messages. Each synchronization time defines a time at which one or more synchronization messages should be sent and/or received. For example, each synchronization time may define a time at which the mobile device 102 may expect to receive a synchronization message or a time at which a synchronization component 106 may plan to send the synchronization message. In one embodiment, a synchronization time includes a synchronization window during which one or more synchronization messages will be received. For example, the synchronization window may define a start time and an end time between which one or more synchronization messages may be received. Two or more synchronization messages may be sent within a single synchronization window.

The synchronization schedule defines a plurality of times at which a scheduled synchronization message will be sent so that a mobile device 102 need not send any synchronization requests. For example, besides the negotiation of the synchronization schedule, a mobile device 102 may not be required to send any additional communications regarding synchronization requests. In one embodiment, the negotiation schedule defines a plurality of different synchronization times when scheduled synchronization messages may be sent. In one embodiment, the negotiated synchronization schedule includes a schedule expiration and the mobile device 102 is not required to send any messages requesting synchronization between negotiation and the expiration of the synchronization schedule.

Figure 5:
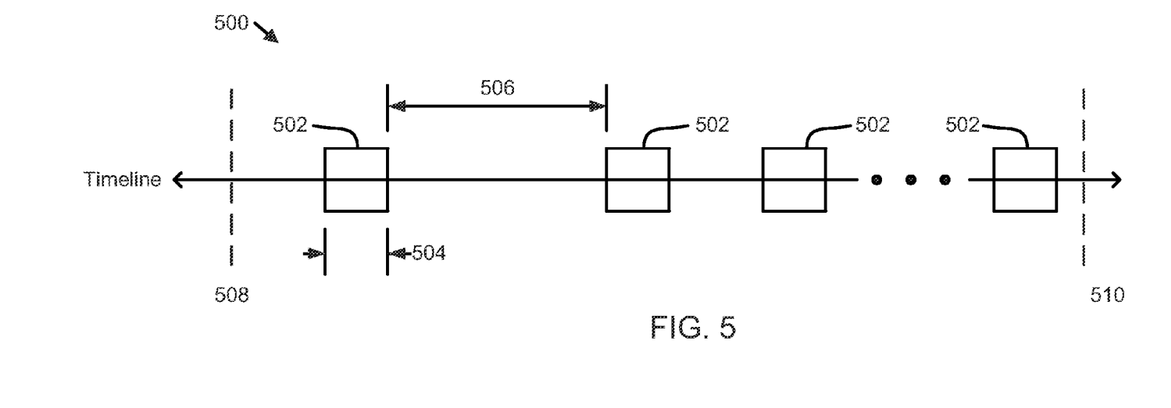
FIG. 5 illustrates a schematic time-line diagram of an example of a synchronization schedule consistent with embodiments disclosed herein.

FIG. 5 illustrates a schematic time-line diagram of one embodiment of a synchronization schedule 500. In one embodiment, the synchronization schedule 500 is a schedule that has been negotiated by the negotiation component 204. In other embodiments, the synchronization schedule 500 may be settled on or generated in a variety of different manners. For example, the negotiation component 204 or the scheduling component 304 of FIG. 3 may generate the synchronization schedule 500.

The synchronization schedule 500 includes example synchronization times that include synchronization windows 502. Each synchronization window 502 defines a time duration during which one or more scheduled synchronization messages can be received by the mobile device 102. The synchronization windows 502 include a time length 504. According to one embodiment, the time length 504 is selected to provide a sufficient length of time duration to send and/or receive a scheduled synchronization message. According to one embodiment, the time length 504 is selected to provide a sufficient time duration to send and/or receive a plurality of scheduled synchronization messages. The time length 504 is selected to provide a sufficient length of time for a mobile device 102 to transition from a sleep state to an awake state and receive a scheduled synchronization message by the end of the synchronization window 502.

The synchronization windows 502 are separated by one or more time lengths 506. The time lengths 506 include periods where no scheduled synchronization messages are expected to be sent and/or received. Each time length 506 is selected to be long enough that a mobile device may enter a low power state for a long enough period of time that there is some energy savings. The time length 506 is selected such that any clock drift or error during the time length 506 is small enough to allow a mobile device 102 to wake during a next synchronization window 502. For example, the time length 506 may be short enough such that any clock drift or error is less than the time length 504 of a synchronization window 502.

The synchronization schedule 500 also includes a schedule start 508 and a schedule expiration 510. The synchronization schedule 500 expires when the schedule expiration 510 is reached and no more scheduled synchronization messages are sent until a synchronization schedule is renegotiated or otherwise settled on. In another embodiment, the synchronization schedule 500 is recycled, or reused, upon reaching the schedule expiration 510. For example, the synchronization schedule 500 may be time shifted such that the schedule start 508 is at the time of the schedule expiration 510 and the synchronization schedule 500 may be repeated. Further discussion of the synchronization schedule 500 is provided in relation to the other example components.

Returning to FIG. 2, according to one embodiment, the state component 206 manages a state of the mobile device 102. The state component 206 transitions the mobile device 102 between a plurality of states. For example, the state component 206 may transition the mobile device 102 between a first state, such as a sleep or idle state, and a second state, such as an awake, or operating state. In other words, the state component may wake the mobile device, put the mobile device to sleep, or put the mobile device in another available state. The state component 206 may transition the mobile device 102 between a plurality of additional states as well, in some embodiments. In one embodiment, the state component 206 transitions the mobile device 102 between states by reducing or removing power from one or more hardware portions of the mobile device 102. In one embodiment, the state component 206 transitions the mobile device 102 between states by placing one or more hardware portions in an idle, sleep, or standby state. For example, a messaging component, GNSS receiver component, CPU, memory, or other component may be placed in an idle state to reduce energy consumption and/or computation requirements of the component. In one embodiment, the state component 206 transitions the mobile device 102 between states by shutting down a process such as a software process or service running on the mobile device 102. In one embodiment, the state component 206 transitions a software process to an idle state. The state component 206 may also transition the mobile device 102 from a lower power state to a higher power state by supplying or increasing power to specific hardware components or restarting or activating a process.

The state component 206 transitions the mobile device 102 between states based on a synchronization schedule, such as the synchronization schedule 500 of FIG. 5. The state component 206 transitions the mobile device 102 between states to ensure that the mobile device 102 is in a state such that it can receive the scheduled synchronization messages. For example, the mobile device 102 may be incapable of receiving a synchronization message in a first state and the state component 206 may transition the mobile device 102 to a second state during a defined synchronization duration such that the mobile device 102 can receive the message. In other words, the state component may periodically wake the mobile device at predetermined times to receive clock correction signals. Similarly, the state component 206 may transition the mobile device 102 to the first state during time periods when no synchronization messages are scheduled to be sent.

As an illustration with respect to the synchronization schedule 500 of FIG. 5, the state component 206 transitions the mobile device 102 from a first state, such as a low power state, to a second state, such as a higher power state, to receive a scheduled synchronization message during the synchronization window 502. Certain embodiments include more than one low power state, for example, as a function of the low power state duration. The state component 206 transitions the mobile device 102 to an appropriate lower power state during a period not including a time synchronization window 502, such as during the time length 506. The state component 206 may place the mobile device 102 in a state where the mobile device cannot receive the scheduled synchronization message during the time length 506 and thereby make the time length 506 a synchronization unavailability period for the mobile device 102.

The update component 208 updates the clock component 202 to be synchronized with a reference clock. For example, the update component 208 may update the clock component 202 to be synchronized with the accurate clock component 108. The update component 208 updates the clock component 202 in response to receiving a scheduled synchronization message or any other clock correction signal. For example, the scheduled synchronization message may include time information which the update component 208 may use to adjust the time of the clock component 202 to be more accurate. Updating the clock may help correct for any clock drift of the clock component 202. According to one embodiment, the update component 208 may consecutively update the clock component 202 based on a series of synchronization messages to more accurately synchronize the clock component 202 with the accurate clock component 108.

Figure 3:
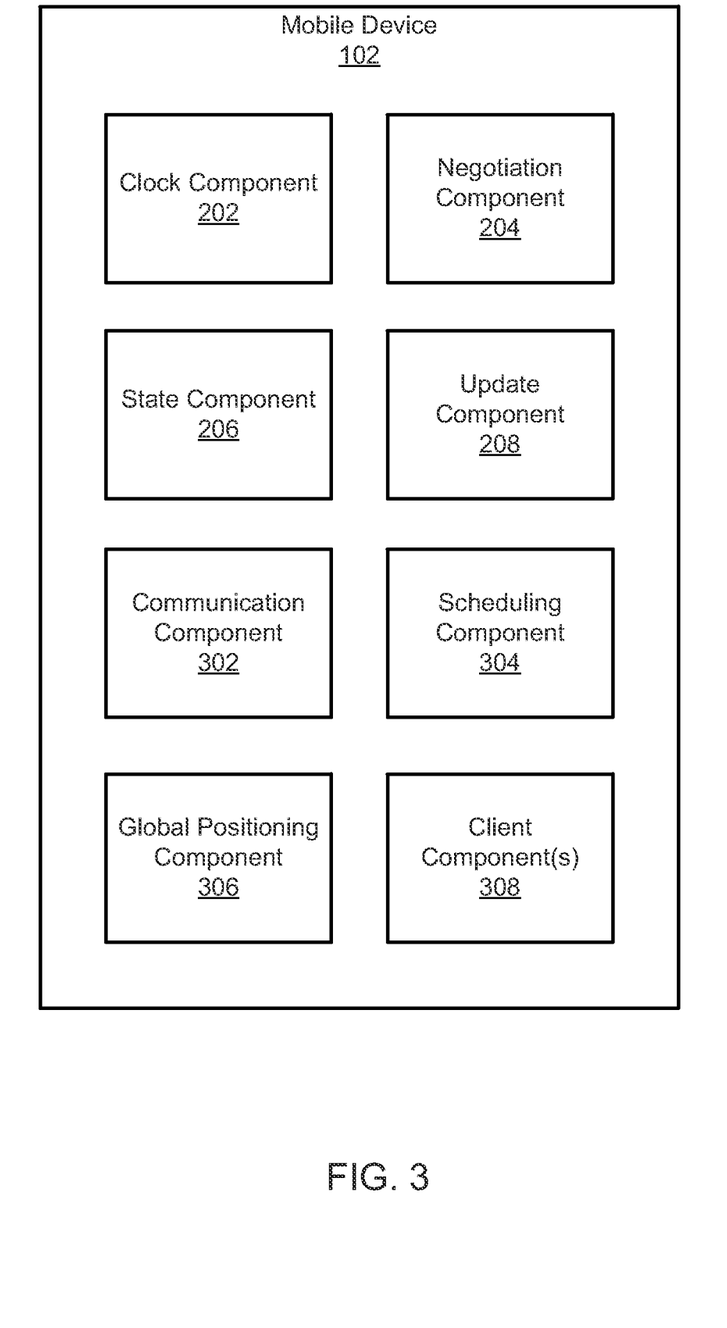
FIG. 3 illustrates a schematic block diagram of another example of a mobile device consistent with embodiments disclosed herein.

FIG. 3 illustrates a schematic block diagram of another embodiment of a mobile device 102. The depicted mobile device 102 includes the clock component 202, negotiation component 204, state component 206, and update component 208 of FIG. 2 with any of the variations and functionality discussed above. The mobile device 102 also includes additional components including a communication component 302, a scheduling component 304, a global positioning component 306, and one or more client component(s) 308. Once again, as discussed above, the components 202, 204, 206, 208 and 302, 304, 306, 308 are provided by way of example only and may not be included in all embodiments. For example, the mobile device 102 may include any one or any combination of two or more of the components 202, 204, 206, 208 and 302, 304, 306, 308 in varying embodiments.

The communication component 302 includes one or more hardware and/or software components for communicating with the RAN 104. For example, the communication component 302 may include any wireless receiver known in the art. The communication component 302 may be configured to operate according to any standard or protocol used by the RAN 104. The communication component 302 sends and receives messages on behalf of the other components 202, 204, 206, 208 and 304, 306, 308 of the mobile device 102. For example, the communication component 302 may receive a synchronization message and route it to the update component 208, send a suggested synchronization schedule to the synchronization component 106 over the RAN 104, and/or receive an indication that a suggested synchronization schedule has been accepted and notify the negotiation component 204. The communication component 302 has high energy requirements and the state component 206 may place the communication component 302 in a lower power state.

The scheduling component 304 stores a synchronization schedule. For example, the scheduling component 304 may include memory for storing a synchronization schedule for access by the components 202, 204, 206, 208, 302, 304, 306, 308 of the mobile device 102. The scheduling component 304 implements a synchronization schedule by triggering actions by other components. For example, the scheduling component 304 may inform the state component 206 of an upcoming synchronization window 502, which may trigger the state component 206 transitioning the mobile device 102 from a lower power state to a higher power state. Similarly, the scheduling component 304 may inform the negotiation component 204 that a synchronization schedule is about to expire and that a new schedule needs to be negotiated.

The scheduling component 304 may determine that a synchronization schedule is needed. In one embodiment, the scheduling component 304 prompts, in response to determining that a synchronization schedule is needed, the negotiation component 204 to negotiate a synchronization schedule. According to one embodiment, the scheduling component 304 determines that a synchronization schedule is needed in response to determining that the mobile device 102 will be entering a low power state. For example, the scheduling component 304 may track current requirements of the mobile device 102 and determine that there is a low enough workload that the mobile device 102 can enter a sleep state or other low power state.

According to another embodiment, the scheduling component 304 predicts future usage requirements of the mobile device 102 and determines that a clock drift or time error may result to a sufficient amount that a scheduled synchronization message may be needed. The scheduling component 304 may track current processes and their requirements to determine whether the mobile device has sufficient time to perform the requirements and sleep/idle for a period of time that would be sufficient to save power usage. In one embodiment, the use requirements include requirements of an application running on the mobile device, a requirement for periodic updates to a global positioning location of the mobile device, requirements of a service running on the mobile device, and/or requirements of a hardware component of the mobile device.

As an example, the scheduling component 304 determines that a first process needs a certain amount of processing every ten seconds and that a second process needs a certain amount of processing every five seconds. The scheduling component 304 determines that the mobile device may be able to go to sleep/idle for four seconds out of every five seconds. The scheduling component determines that this would be a sufficient amount of time such that energy will be saved and may therefore determines that a synchronization schedule is needed.

The scheduling component 304 may determine or generate a time synchronization schedule. For example, the scheduling component 304 may determine or generate a time synchronization schedule that can be suggested by the negotiation component 204 during negotiation. In one embodiment, the scheduling component 304 determines or generates a time synchronization schedule in response to determining that a synchronization schedule is needed.

According to another embodiment, the scheduling component 304 determines or generates a time synchronization schedule based on predicted future usage requirements of the mobile device 102. For example, the scheduling component 304 may predict future usage requirements of the mobile device 102, as described above in relation to determining whether a synchronization schedule is needed. Based on the predicted future usage, the scheduling component determines points in time when a synchronization will be needed. For example, the mobile device 102 may require a synchronization after coming out of a low power state. As another example, the mobile device 102 may require a synchronization prior to obtaining a GNSS fix or performing another synchronization sensitive process, as required by one or more applications or services running on the mobile device 102. For example, the client components 308 may include services such as a navigation application, or other application that requires periodic GNSS fixes.

In the example given above, if the mobile device 102 is able to sleep/idle for four out of every five seconds, the scheduling component 304 may create a synchronization time for a time when the mobile device is just coming out of a sleep state. This may allow the mobile device 102 to be synchronized prior to performing any functions and then go back to sleep as soon as those functions are performed.

According to one embodiment, the scheduling component 304 generates the synchronization schedule 500 of FIG. 5 with synchronization windows 502. The scheduling component may select the time lengths 504 of the synchronization windows 502 to allow the mobile device to receive a scheduled synchronization message. According to one embodiment, the scheduling component 304 selects the time length 504 to provide a sufficient length of time for a mobile device 102 to transition from a sleep state to an awake state and receive a scheduled synchronization message by the end of the synchronization window 502. The scheduling component 304 may create a synchronization schedule with time lengths 506 long enough that a mobile device 102 may enter a low power state for a long enough period of time that there is some energy savings. In one embodiment, the scheduling component 304 creates a synchronization schedule with time lengths 506 small enough such that any clock drift or error during the time length 506 will not be enough to keep the mobile device 102 from waking in time for a next synchronization window 502.

In one embodiment, the scheduling component 304 determines a schedule start 508 that corresponds to the usage requirements of the mobile device 102. In one embodiment, the scheduling component 304 determines a schedule expiration 510 such that synchronization schedule 500 is likely to be accurate for the length of the synchronization schedule 500. For example, synchronization schedules 500 that are too long may not accurately reflect the usage requirements of the mobile device 102 and may thus need to be terminated before the schedule expiration 510 is reached.

In one embodiment, the scheduling component 304 determines that time synchronization is no longer needed. According to one embodiment, the scheduling component 304 determines that the mobile device is too busy to enter the first state. For example, a user may have picked up a mobile device 102, such as a smart phone, during the synchronization schedule and began using the device. Based on the increased activity, the scheduling component 304 may determine that the mobile device 102 is too busy to sleep/idle and may determine that the synchronization schedule is no longer needed. As another example, the scheduling component 304 may detect that all components that are synchronization sensitive are no longer in use and determine that the synchronization schedule is no longer needed.

In one embodiment, the scheduling component 304 determines that time synchronization is no longer needed prior to a schedule expiration 510 of a synchronization schedule 500. In one embodiment, the scheduling component 304 may terminate a synchronization schedule 500 prior to the schedule expiration 510. For example, the scheduling component 304 may trigger a notification to a synchronization component 106 that the schedule is no longer needed. In another embodiment, the scheduling component 304 terminates the synchronization schedule 500 at the schedule expiration 510. For example, the scheduling component 304 may trigger a notification to a synchronization component 106 that synchronization schedule 500 should be allowed to expire at the schedule expiration 510. In one embodiment, if the scheduling component 304 determines that the synchronization schedule 500 will still be needed after the schedule expiration 510, the synchronization schedule 500 is allowed to be recycled. For example, a time-shifted version of the synchronization schedule 500 may be used upon expiration. In one embodiment, the scheduling component 304 triggers a message to a synchronization component 106 that the synchronization schedule 500 should be recycled.

The global positioning component 306 may include hardware or software configured to interact with a satellite of a GNSS. For example, the global positioning component 306 may include a GNSS receiver that is configured to detect signals from any GNSS including, for example, global position system (GPS) satellites, BeiDou navigation system (BieDou or Compass) satellites, Global Navigation Satellite System (GLONASS) satellites, the other satellite positioning systems mentioned herein, and the like. One skilled in the art will recognize numerous location components for determining a location of a device which may be used in one or more embodiments. According to one embodiment, the global positioning component 306 may obtain a GNSS fix and provide location information to the mobile device 102 and/or its components 202, 204, 206, 208 and 302, 304, 308.

According to one embodiment, the global positioning component 306 obtains a GNSS fix based on needs of the client component 308. For example, a client component 308 may be a hardware and/or software component that utilizes a geographical location for one or more functions. Examples of client components 308 that may need a geographical location include navigation applications, emergency (e.g., 911) location applications, position logging applications, and the like. According to one embodiment, the global positioning component 306 obtains a global positioning location in response to the update component 208 updating the clock component 202. The global positioning component 306 then provides positioning information to the client component 308. According to one embodiment, global positioning component 306 requires large amounts of battery and/or CPU usage and is thus transitioned to a low power state by the mobile device 102 when not in use.

The client components 308 may include any software or hardware component on a mobile device 102. According to one embodiment, a client component 308 includes a position logging program for a communication standard. According to another embodiment, a client component 308 includes a navigation application.

Figure 4:
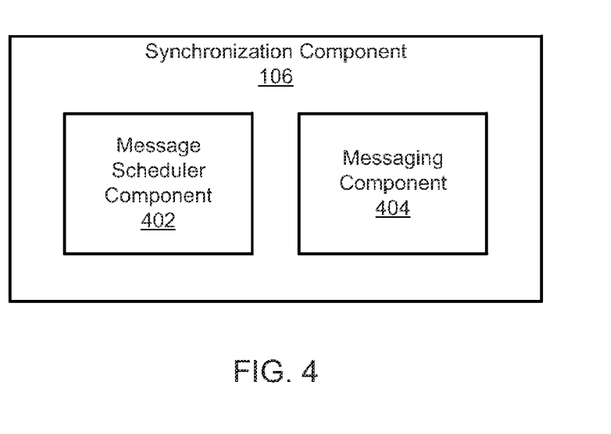
FIG. 4 illustrates a schematic block diagram of an example of a synchronization component consistent with embodiments disclosed herein.

FIG. 4 illustrates a schematic block diagram of an embodiment of a synchronization component 106. According to one embodiment, the synchronization component 106 includes one or more hardware components that communicate with the mobile device 102 regarding time synchronization and synchronization schedules. For example, the synchronization component 106 may negotiate a synchronization schedule with the mobile device 102 and send synchronization messages based on the synchronization schedule. The depicted synchronization component 106 is shown including a message scheduler component 402 and a messaging component 404. The components 402, 404 are provided by way of example only and may not be included in all embodiments.

In one embodiment, the message scheduler component 402 negotiates a synchronization schedule with a negotiation component 204 of a mobile device 102. For example, the message scheduler component 402 may receive a suggested synchronization schedule and provide an indication of acceptance. In one embodiment, the message scheduler component 402 compares the suggested schedule with a schedule for the synchronization component 106 or a host device of the synchronization component 106. If the synchronization component 106 is able to meet the requirements of the proposed schedule, the message scheduler component 402 provides the indication of acceptance of the synchronization schedule. However, if the synchronization component 106 is unable to meet the requirements of the proposed schedule, the message scheduler component 402 provides an indication of rejection of the synchronization schedule. In one embodiment, the message scheduler component 402 suggests an alternate synchronization schedule to the mobile device 102 that the synchronization component 160 is able to meet. The message scheduler component 402 may receive an indication that the alternate synchronization schedule has been accepted.

In one embodiment, the message scheduler component 402 stores a synchronization schedule. For example, the message scheduler component 402 may store the synchronization schedule that has been agreed on by the mobile device 102. According to another embodiment, the message scheduler component 402 transfers a portion of the synchronization schedule into an overall message synchronization schedule that controls the messages sent to a plurality of different mobile devices 102. For example, the synchronization schedule may serve more than one mobile device 102 with synchronization messages.

In one embodiment, the message scheduler component 402 receives an indication from a mobile device 102 that synchronization is no longer needed. For example, a message or other information may be received indicating that the mobile device 102 no longer wants synchronization messages. In one embodiment, the message scheduler component 402 removes a corresponding synchronization schedule and/or scheduled messages in response to receiving the indication that synchronization is no longer needed.

In one embodiment, the message scheduler component 402 recycles a synchronization schedule for a mobile device 102 upon expiration of the synchronization schedule. For example, if the message scheduler component 402 receives a message indicating that further synchronizations are desired or needed, the message scheduler component 402 may time shift the synchronization schedule 500 such that the schedule start 508 is at the original schedule expiration 510. In one embodiment, the message scheduler component 402 defaults to recycling a synchronization schedule 500 for a certain number of times or indefinitely unless a message terminating the synchronization schedules is received.

The messaging component 404 may send synchronization messages according to a message synchronization schedule stored by a messaging scheduler component 402. For example, if the synchronization schedule 500 of FIG. 5 is stored corresponding to a particular mobile device 102, the messaging component 404 may send one or more synchronization messages to that particular mobile device during the synchronization windows 502.

Figure 6:
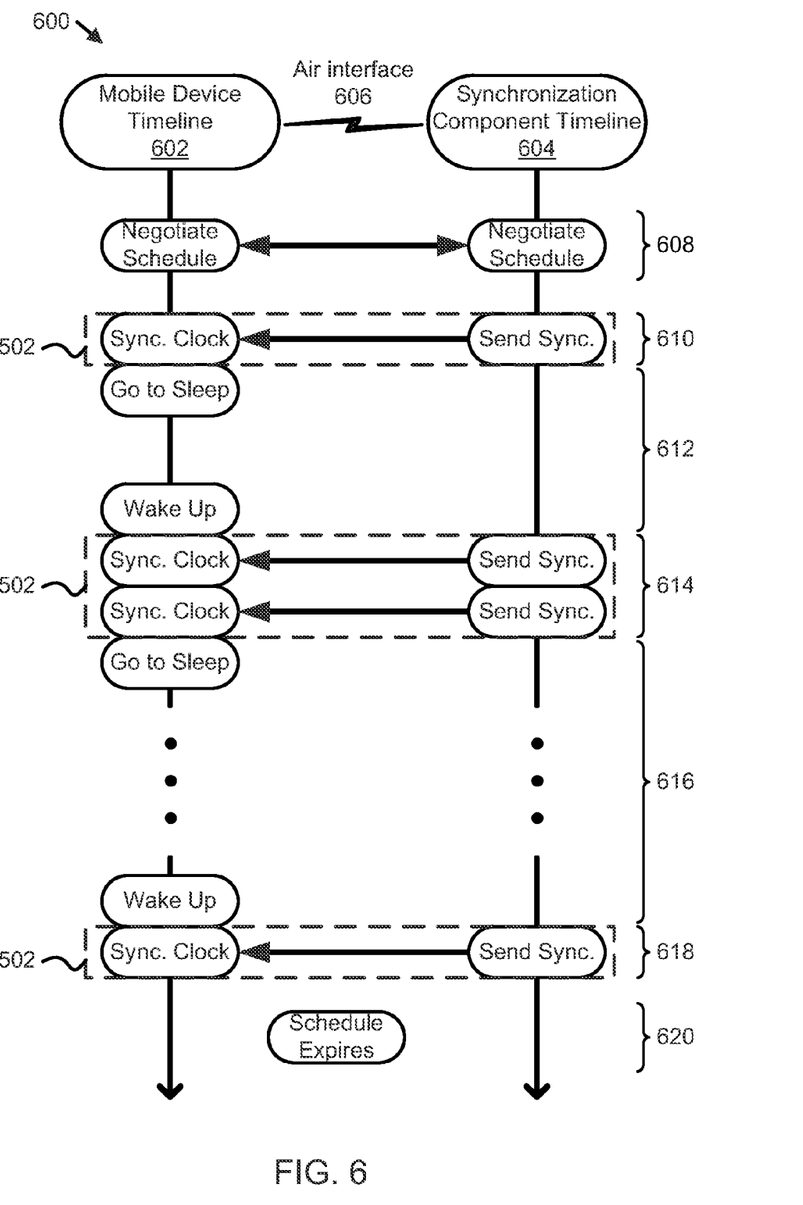
FIG. 6 illustrates a schematic flow chart diagram of an example of interaction between a mobile device and a synchronization component consistent with embodiments disclosed herein.

FIG. 6 illustrates a schematic flow chart diagram 600 of interaction between a mobile device 102 and a synchronization component 106. The diagram 600 depicts a mobile device timeline 602 and a synchronization component timeline 604 illustrating what steps each of the mobile device 102 and the synchronization component 106 may perform at a given time. Air interface 606 indicates that communication between the mobile device 102 and the synchronization component 106 is wireless. The timelines are split into a number of periods 608, 610, 612, 614, 616, 618, 620 to illustrate how actions performed by each of a mobile device 102 and a synchronization component 106 correspond.

During period 608, the mobile device 102 and a synchronization component 106 negotiate a synchronization schedule. The negotiation component 204 and the message scheduler component 402 negotiate to determine a synchronization schedule. During this period the messages are sent and received by both the mobile device 102 and the synchronization component 106. The mobile device 102 may be required to send only one message, e.g., a message including a suggested synchronization schedule, during the period 608. However other messages may also be sent during the period 608.

During period 610, the messaging component 404 of the synchronization component 106 sends a synchronization message to the mobile device 102 based on the time tracked by the accurate clock component 108. The mobile device 102 receives the synchronization message and the update component 208 updates the clock component 202 to be synchronized with the accurate clock component 108. The mobile device 102 does not send any messages requesting synchronization during the period 610. The period 610 corresponds to a synchronization window 502 of a synchronization schedule.

Note that although "Sync. Clock" and "Send Sync." are depicted as filling the whole of the synchronization window 502, these steps may only take a small portion of the time. In fact, multiple synchronization messages may fit within a single synchronization window. For example, the mobile device 102 and the synchronization component 106 may only spend a small fraction of period 610 actually sending, receiving, and/or synchronizing a clock. Other steps or functions may be performed within those same time periods.

During period 612, the state component 206 causes the mobile device 102 to transition to a low power state. The mobile device 102 remains in the low power state for a period of time, saving battery and computational power. Near the end of the period 612, the state component 206 causes the mobile device 102 to transition to a higher power state so that synchronization messages can be received.

During period 614, a plurality of synchronization messages are sent by the messaging component 404 of the synchronization component 106 to the mobile device 102. The mobile device 102 receives the synchronization messages and the update component 208 updates the clock component 202 to be synchronized with the accurate clock component 108.

During period 616, the state component 206 transitions the mobile device 102 to a low power state and then transitions the mobile device 102 to a higher power state in time for a next synchronization window 502. One or more additional synchronization windows 502 or negotiations may take place during period 616. For example, a negotiation may take place only part way through a synchronization schedule in the case of usage requirements of a mobile device 102.

During period 618, a synchronization message is sent by the messaging component 404 of the synchronization component 106 to the mobile device 102. The mobile device 102 receives the synchronization message and the update component 208 updates the clock component 202 to be synchronized with the accurate clock component 108.

During period 620, a synchronization schedule may expire. According to one embodiment, the mobile device 102 and the synchronization message may default to letting a synchronization message expire upon a schedule expiration. For example, a message from the mobile device 102 to the synchronization component 106 may be required to recycle use of the synchronization schedule. In such an embodiment, no further messages between the mobile device 102 and the synchronization component 106 may be required if the mobile device 102 no longer needs additional synchronizations. In another embodiment, the mobile device 102 and the synchronization component 106 may default to recycling a synchronization message upon a schedule expiration. For example, a message from the mobile device 102 to the synchronization component 106 may be required to terminate the use of the synchronization schedule. In this embodiment, no further messages between the mobile device 102 and the synchronization component 106 may be required if the mobile device 102 continues to need synchronizations according to the already negotiated synchronization schedule.

Figure 7:
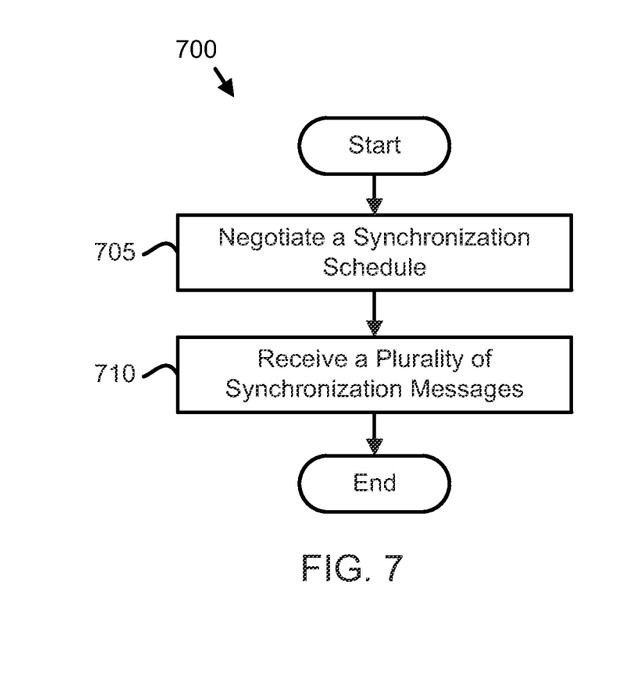
FIG. 7 illustrates a flow chart of a method for efficient time synchronization consistent with embodiments disclosed herein.

FIG. 7 illustrates a flow chart of a method 700 for efficient time synchronization, according to one embodiment. The method 700 may be performed by a mobile device 102. One of skill in the art will recognize that considerable variation of method 700 consistent with the present disclosure is possible.

The method 700 begins and a negotiation component 204 negotiates 705 a synchronization schedule. In one embodiment, the negotiation 705 by the negotiation component 204 includes suggesting a synchronization schedule to a synchronization component 106. In one embodiment, the negotiation 705 by the negotiation component 204 includes receiving an indication that the synchronization schedule is accepted. The synchronization schedule may define two or more times for receiving synchronization messages. The synchronization schedule may include a schedule expiration.

The method 700 further includes the mobile device 102 receiving 710 two or more synchronization messages. The two or more synchronization messages are received 710 during the two or more times defined by the synchronization schedule. The received 710 synchronization messages are used to update a clock component 202 of a mobile device. According to one embodiment, a plurality of synchronization messages are received 710 at different times without the mobile device 102 sending a synchronization request. In one embodiment, no synchronization request message is sent by the mobile device 102 between negotiation and the schedule expiration.

Figure 8:
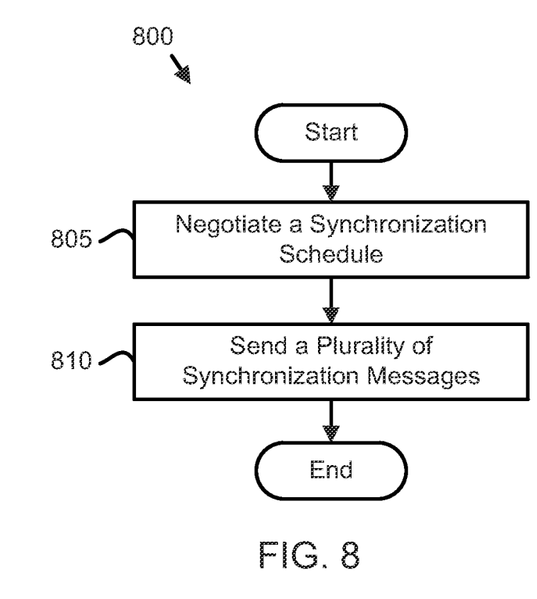
FIG. 8 illustrates a flow chart of another method for efficient time synchronization consistent with embodiments disclosed herein.

FIG. 8 illustrates a flow chart of a method 800 for efficient time synchronization. According to one embodiment, the method 800 may be performed by a synchronization component to synchronize time with a mobile device 102. One of skill in the art will recognize that method 800 is an example method only and that considerable variation consistent with the present disclosure is possible.

The method 800 begins and a message scheduler component 402 negotiates 805 a synchronization schedule. The negotiation 805 by the message scheduler component 402 may include receiving a suggested synchronization schedule from mobile device 102. The negotiation 805 by the message scheduler component 402 may include sending an indication that the synchronization schedule is accepted. In one embodiment, the synchronization schedule may define two or more times for receiving synchronization messages.

The method 800 further includes a messaging component 404 sending 810 two or more synchronization messages to the mobile device 102. The messaging component 404 sends 810 the two or more synchronization messages during the two or more times defined by the synchronization schedule. According to one embodiment, the messaging component 404 sends 810 each of the two or more synchronization messages without receiving any further messages from the mobile device 102.

Figure 9:
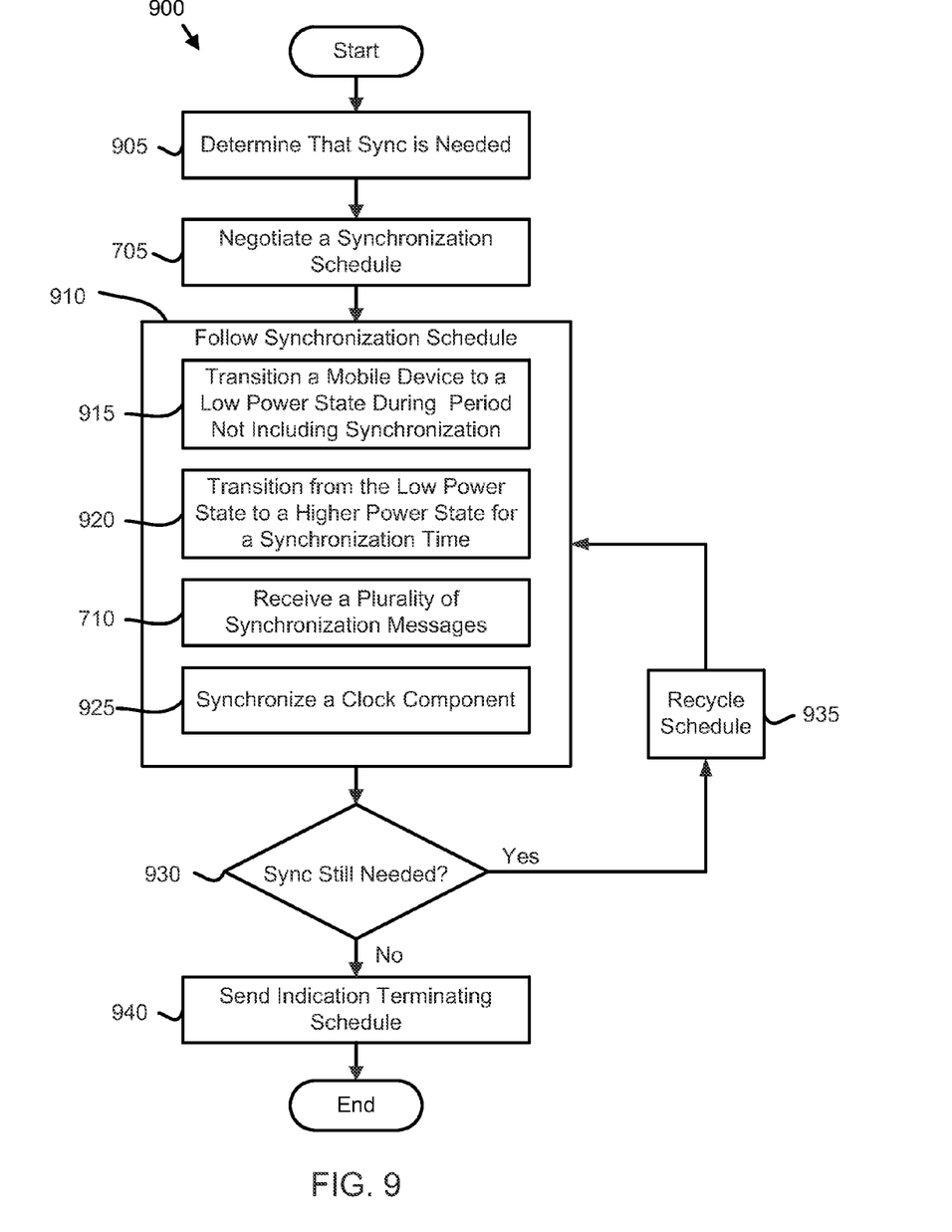
FIG. 9 illustrates a flow chart of yet another method for efficient time synchronization consistent with embodiments disclosed herein.

FIG. 9 illustrates a flow chart of a method 900 for efficient time synchronization. The method 900 may be performed by a mobile device 102. One of skill in the art will recognize that method 900 is an example only and that considerable variation consistent with the present disclosure is possible. For example, some embodiments may include fewer and/or additional steps.

The method 900 includes a scheduling component 304 determining 905 that a time synchronization will be needed. In one embodiment, the scheduling component 304 determines 905 that the time synchronization is needed based on current usage of the mobile device 102. In another embodiment, the scheduling component 304 determines 905 that the time synchronization is needed based on predicted future usage of the mobile device 102. In one embodiment, the scheduling component 304 determines 905 that the time synchronization is needed based on the mobile device 102 preparing to enter a low power state.

As with the method 700 of FIG. 7, method 900 includes a negotiation component 204 negotiating 705 a synchronization schedule. According to one embodiment, the negotiation component 204 may negotiate 705 the synchronization schedule in response to the scheduling component determining 905 that a time synchronization will be needed. In one embodiment, negotiation 705 may include any of the variations disclosed within method 700 of FIG. 7 or elsewhere in this disclosure.

The method 900 includes a mobile device 102 following 910 a synchronization schedule. The mobile device 102 operates according to the requirements of the synchronization schedule. The mobile device 102 may operate such that the mobile device 102 is prepared to receive synchronization messages when they are scheduled to be sent as defined in the synchronization schedule.

Following 910 the synchronization schedule includes transitioning 915 the mobile device 102 to a low power state during a period not including synchronization. In one embodiment, transitioning 915 the mobile device 102 to a low power state includes placing the mobile device 102 in a sleep mode or an idle mode, reducing power to one or more hardware components, and/or suspending a software process.

Following 910 the synchronization schedule includes transitioning 920 the mobile device 102 from the low power state to a higher power state for a synchronization time as defined by the synchronization schedule. In one embodiment, transitioning 920 the mobile device 102 to the higher power state includes placing the mobile device 102 in an awake or active mode, increasing or providing power to one or more hardware components, and/or activating a software process.

In one embodiment, following 910 the synchronization schedule includes receiving 710 two or more synchronization messages as discussed in relation to the method 700 of FIG. 7. In one embodiment, the two or more synchronization messages are received 170 in response to transitioning 920 from the low power state to the higher power state. Further variations as discussed in relation to FIG. 7 are also possible.

In one embodiment, following 910 the synchronization schedule includes an update component 208 synchronizing 925 a clock component 202. The update component 208 synchronizes 925 the clock component 202 based on a received 710 synchronization message.

The method 900 includes a scheduling component 304 determining 930 whether synchronization is still needed. The scheduling component 304 may determine 930 that time synchronization is still needed based on any of the variations discussed in relation to step 905. In one embodiment, the scheduling component 304 determines 930 that the time synchronization is not needed based on current usage of the mobile device 102, predicted future usage of the mobile device 102, and/or the mobile device 102 being too busy to enter a lower power state.

In one embodiment, if the scheduling component 304 determines 930 that synchronization is still needed ("Yes" at decision 930) the scheduling component 304 may recycle 935 a current synchronization schedule. For example, the scheduling component 304 may create a time-shifted version of the current synchronization schedule and follow 910 the time-shifted synchronization schedule.

In one embodiment, if the scheduling component 304 determines 930 that synchronization is no longer needed ("No" at decision 930) the scheduling component 304 may send 940 a message indicating that the schedule has been terminated. In one embodiment, the message indicating that the schedule has been terminated may be sent to the synchronization component 106 so that synchronization messages will no longer be sent. According to one embodiment, the method 900 may then end. According to one embodiment, the method 900 may restart again if the scheduling component 304 determines 905 that time synchronizations are again needed.

Some of the infrastructure that can be used with embodiments disclosed herein is already available, such as general-purpose computers, servers, mobile phones, computer programming tools and techniques, digital storage media, and communications networks. A computing device may include a processor such as a microprocessor, microcontroller, logic circuitry, or the like. The processor may include a special purpose processing device such as an application-specific integrated circuit (ASIC), programmable array logic (PAL), programmable logic array (PLA), programmable logic device (PLD), field programmable gate array (FPGA), or other customized or programmable device. The computing device may also include a computer-readable storage device such as non-volatile memory, static random access memory (RAM), dynamic RAM, read only memory (ROM), compact disk read-only memory (CD-ROM), disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method for time synchronization in a mobile device, the method comprising:
   negotiating a synchronization schedule, the synchronization schedule defining a plurality of synchronization times for receiving synchronization messages;
   transitioning the mobile device from a first state to a second state to receive a synchronization message of the synchronization messages, wherein the mobile device uses less power in the first state than the second state and wherein the mobile device cannot receive the synchronization message when in the first state;
   synchronizing a clock component in response to receiving the synchronization message; and
   sending a notification that synchronization is no longer needed.

2. The method of claim 1, wherein the synchronization schedule comprises a schedule expiration and wherein no synchronization request message is sent by the mobile device between negotiation and the schedule expiration.

3. The method of claim 1, wherein the synchronization message is received from a radio access network.

4. The method of claim 3, wherein the radio access network comprises a portion of a mobile data network.

5. The method of claim 1, wherein negotiating the synchronization schedules comprises:

suggesting the synchronization schedule to a synchronization component; and
   receiving an indication that the synchronization schedule is accepted.

6. The method of claim 1, further comprising determining a time synchronization schedule.

7. The method of claim 6, wherein determining comprises determining a time synchronization schedule based on use requirements of a mobile device.

8. The method of claim 1, wherein a time of the plurality of times comprises a time window, wherein transitioning comprises transitioning from the first state to the second state for at least the length of the time window.

9. The method of claim 1, further comprising determining that time synchronization will be needed.

10. The method of claim 9, wherein negotiating comprises negotiating in response to determining that time synchronization will be needed.

11. The method of claim 9, wherein determining comprises determining that the mobile device will be entering the first state.

12. The method of claim 1, further comprising determining one or more times at which synchronization will be needed.

13. The method of claim 1, further comprising determining that time synchronization will no longer be needed.

14. The method of claim 13, further comprising notifying a synchronization server that the synchronization schedule is no longer needed.

15. The method of claim 13, wherein determining comprises determining that the mobile device is too busy to enter the first state.

16. A computer-readable storage medium comprising program code to perform a method for efficient time synchronization, the method comprising:
   negotiating a synchronization schedule, the synchronization schedule defining a plurality of synchronization times for receiving synchronization messages, wherein the synchronization schedule comprises a schedule expiration;
   receiving the synchronization messages at the plurality of synchronization times, wherein no synchronization request message is sent by the mobile device between negotiation and the schedule expiration; and
   sending a notification that synchronization is no longer needed.

* * * * *